US009182951B1

(12) United States Patent
Ormerod et al.

(10) Patent No.: US 9,182,951 B1
(45) Date of Patent: Nov. 10, 2015

(54) MULTI-ECOSYSTEM APPLICATION PLATFORM AS A SERVICE (APAAS)

(71) Applicant: Progress Software Corporation, Bedford, MA (US)

(72) Inventors: David Michael Ormerod, Hollis, NH (US); Robert Steward, Winston-Salem, NC (US)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 14/289,157

(22) Filed: May 28, 2014

Related U.S. Application Data

(60) Provisional application No. 61/887,136, filed on Oct. 4, 2013.

(51) Int. Cl.
*G06F 9/44* (2006.01)

(52) U.S. Cl.
CPC .......................................... *G06F 8/34* (2013.01)

(58) Field of Classification Search
USPC ................... 717/105–19, 120–121, 104–109
IPC .......................................... G08F 8/20,8/34, 8/60
See application file for complete search history.

(56) References Cited

U.S. PATENT DOCUMENTS

| | | | | |
|---|---|---|---|---|
| 6,802,053 | B1 * | 10/2004 | Dye et al. ....................... | 717/113 |
| 7,089,530 | B1 * | 8/2006 | Dardinski et al. ............. | 717/105 |
| 7,290,244 | B2 * | 10/2007 | Peck et al. ..................... | 717/109 |
| 7,483,901 | B1 * | 1/2009 | Massoudi et al. ............... | 1/1 |
| 7,624,375 | B2 * | 11/2009 | Santori et al. ................. | 717/121 |
| 7,725,874 | B2 * | 5/2010 | Kornerup et al. ............. | 717/105 |
| 7,814,125 | B2 * | 10/2010 | Berry et al. .................... | 707/803 |
| 8,392,876 | B2 * | 3/2013 | Austin et al. .................. | 717/105 |
| 8,468,244 | B2 * | 6/2013 | Redlich et al. ................ | 709/225 |
| 8,671,387 | B2 * | 3/2014 | Quine .......................... | 717/105 |
| 8,712,953 | B2 * | 4/2014 | Beringer et al. .............. | 707/600 |
| 8,806,348 | B2 * | 8/2014 | Quine .......................... | 715/744 |
| 8,898,628 | B2 * | 11/2014 | Raza ............................. | 717/107 |

OTHER PUBLICATIONS

Fraternali et al, "Engineering Rich Internet Applications with a Model-Driven Approach", ACM Transactions on the Web, vol. 4, No. 2, Article 7, pp. 1-47, 2010.*
Dogdu et al, "A Data-Model Driven Web Application Development Framework", ACM, pp. 1-4, 2014.*
Yang et al, "A Unified Platform for Data Driven Web Applications with Automatic Client-Server Partitioning ", ACM, pp. 341-350, 2007.*
Yang, "Using Data Driven Simulation to Build Inventory Model ", IEEE, pp. 2595-2599, 2008.*

\* cited by examiner

*Primary Examiner* — Anil Khatri
(74) *Attorney, Agent, or Firm* — Patent Law Works LLP

(57) ABSTRACT

An application Platform as a Service system includes a rapid development platform adapted to receive input and create a data-driven application. The rapid development platform provides a graphical user interface and at least one template for use in creating the data driven application. The system further includes a unified platform for executing the data-driven application, the unified platform coupled to the rapid development platform to receive and initialize the data-driven application. The unified platform is capable of communicating with and modifying a plurality of data sources responsive to the data-driven application, and providing a unified environment for executing the data-driven application. The system also includes a multi-system interface module having inputs and outputs for coupling the unified platform to the plurality of data sources. The present invention also includes methods for operation of the application platform as a service.

19 Claims, 7 Drawing Sheets

MULTI-ECOSYSTEM APPLICATION PLATFORM AS A SERVICE (APAAS)

CROSS REFERENCE TO RELATED APPLICATIONS

This application claims priority under 35 USC §119(e) to U.S. Application No. 61/887,136 entitled "Multi-Ecosystem Platform as a Service (PaaS) and Application Platform as a Service (aPaaS)" filed Oct. 4, 2013, the entirety of which is herein incorporated by reference.

BACKGROUND OF THE INVENTION

1. Field of the Invention

The present invention relates to a Platform as a Service (PaaS) and an application Platform as a Service (aPaaS). More specifically, the present invention relates to a multi-ecosystem aPaaS and multi-ecosystem PaaS that can connect with multiple data sources on multiple platforms.

2. Description of the Related Art

The use and proliferation of applications has increased dramatically in recent years with the increases in computing power, portability, and the growth of networks. While databases and data-driven applications were historically operated on a single system or a network of computers coupled to the database that is no longer the case. In recent years, new computing platforms such as cloud computing, software as a service, and other data sources have become more common.

One current problem with existing systems is that with the proliferation of these different data sources, it is difficult to connect existing databases so that they may cooperate with multiple data sources and utilize and interact with those other data sources. The data users need for business applications is no longer confined to a simple, single relational database management system. Many users now have different sets of data that are silos in different sources whether they be on premise, off premise, accessible via a software as a service, accessible via private network, or accessible via the Internet. For example, many users may have one system for customer relationship management, a second system for social networking, and a third system for historical business such as fulfillment, human resources, and/or finance. Typically, in order for an application to utilize these other sources of information, if that is even possible, requires a significant investment of time and energy as well as access to a technical expert that can program the business applications to interact with multiple data sources.

Another problem with the proliferation of computing is that it has created multiple numbers of different platforms. No longer can applications for a particular database or database system be written as desktop only applications specific to that database. Now users demand access to the database via mobile devices and the web as well as access via the desktop. Currently in order to provide such access again require significant investment of time and technical expertise to modify existing database systems to cooperate with mobile devices and the web.

Finally, an additional problem with the prior art is the need to create data-driven business applications very quickly. In many instances, the users do not have the time required for programmers to develop new business applications. There is a need for a system that allows a non-technical business person without deep technical skills to create data-driven business applications. In many cases, business applications are needed immediately without a long, expensive IT project that has been historically required to create new applications for database systems.

Thus there is a need for a system that provides rapid development of data-driven applications for any cloud, mobile, or social platform.

SUMMARY

According to one innovative aspect of the subject matter in this disclosure, an application Platform as a Service system includes: a rapid development platform adapted to receive input and create a data-driven application, the rapid development platform providing an graphical user interface and at least one template for use in creating the data driven application; a unified platform for executing the data-driven application, the unified platform coupled to the rapid development platform to receive and initialize the data-driven application, the unified platform capable of communicating with and modifying a plurality of data sources responsive to the data-driven application, and providing a unified environment for executing the data-driven application; and a multi-system interface module having inputs and outputs for coupling the unified platform to the plurality of data sources.

In general, another innovative aspect of the subject matter described in this disclosure may be embodied in methods that include building a data-driven application; publishing the data-driven application to a platform; selecting at least one data resources for the application from a plurality of data resources; initializing a connection between the selected data resource and the application; and selecting an access type and a user interface for accessing the application.

Other implementations of one or more of these aspects include corresponding systems, apparatus, and computer programs, configured to perform the actions of the methods, encoded on computer storage devices.

These and other implementations may each optionally include one or more of the following features. For instance, the features may further include wherein the rapid development platform includes a model driven application development platform for generating software as a service (SaaS) business applications or a complete application development platform for building dynamic business process-enabled applications. For instance, the features may further include wherein a portion of the unified platform application is operable in the cloud, wherein the unified platform includes an on premise relational database management system; the unified platform also provides a unified environment for managing and maintaining data-driven application. Additional features may further include unified platform including a process and policy module for enforcing business processes and business rules upon execution of the data-driven application; an analytics module for monitoring operation and performance of the data-driven application; a security and management module for controlling security of access to the data, data management, and integration of business logic; includes one or more data servers and a replication module. For instance, the features may further include the multi-system interface module including a database interface module, a mobile interface module, a web interface module, or a third party interface module or where the third party application is one from the group of a social network application, a software as a service application, a customer relationship management application, and human resources application, and an enterprise resource planning application.

These implementations are particularly advantageous in a number of respects. For instance, the technology described herein provides a unified environment for data-driven application development. First, the rapid development platform includes a system that allows a non-technical user to create data-driven business applications quickly and easily by providing by providing a user interface that allows point-and-click and drag-and-drop development in a browser. Second, the unified platform provides a unified environment in which the data-driven application can access data sources including on premise data, private data, public data, and data from software as a service applications. The unified platform also provides multi-tenancy, scalability, business rules, data management, integration of business logic, development tools, development community, security and compliance. Finally, the multisystem interface module allows the data-driven application to be accessed via mobile devices, the web, and desktop applications.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
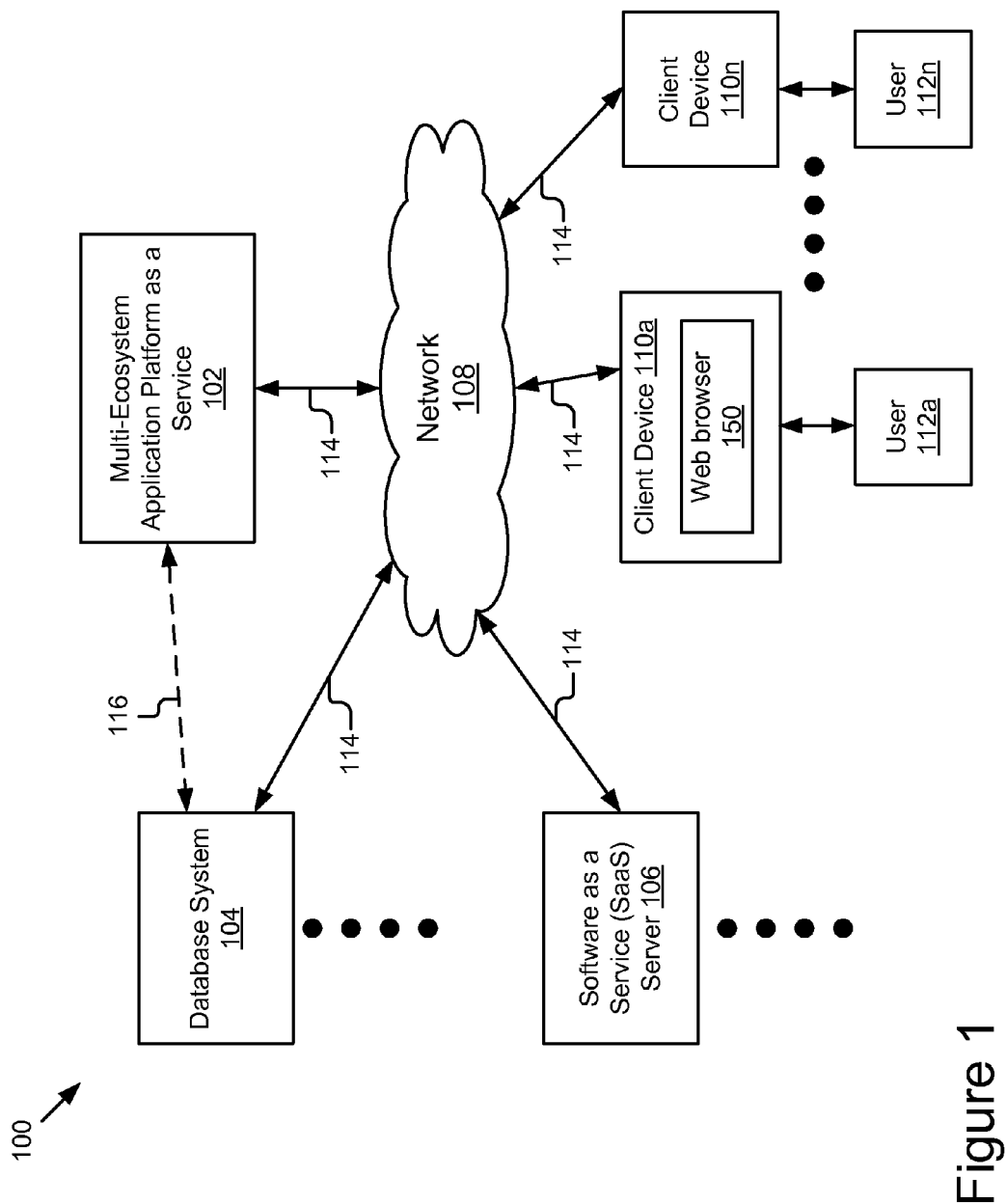
FIG. 1 is a high-level block diagram illustrating a system including an example multi-ecosystem application Platform as a Service (aPaaS) according to one embodiment.

FIG. 1 illustrates a high-level block diagram of an application Platform as a Service (aPaaS) system 100 according to some implementations of the present disclosure. The illustrated system 100 includes a multi-ecosystem application platform as a service 102, one or more database systems 104, one or more software as a service server 106, a network 108, and client devices 110a-110n (also referred to herein individually and collectively as 110) that are accessed by users 112a-112n (also referred to herein individually and collectively as 112). These components of the system 100 are coupled by signal line 112 to the network 106 and by the network 106 to each other for communication and cooperation. In some embodiments, the database system 104 may be directly coupled for communication and cooperation to the multi-ecosystem application platform as a service 102 as shown by signal line 116.

The application Platform as a Service (aPaaS) system 100 of the present invention enables rapid development of data-driven applications for multiple platforms such as cloud, mobile and social. The application Platform as a Service (aPaaS) system 100 of the present invention is particularly advantageous for a number of reasons. First, it provides user interfaces and a system 102 that allow development of data-driven applications very quickly and without the requirement for deep technical skills and knowledge. Second, the system 100 may be connected to various different critical data sources of different types. While only one database systems 104 and one software as a service servers 106 are shown as data sources in FIG. 1, it should be understood that the multi-ecosystem application platform as a service 102 could be coupled by the network 108 to various other data sources other than those two types. Third, the system 100 allows the users to interact with the system 100 using multiple different platforms.

The multi-ecosystem application platform as a service 102 is coupled to the other components of the system 100 and provides the functionality described above. The multi-ecosystem application platform as a service 102 is coupled to the network 108 via signal line 114 for communication and cooperation with the other components of the system 100. In particular, the multi-ecosystem application platform as a service 102 is coupled for communication with client devices 110 so that users 112 may create data-driven applications using drag-and-drop and point-and-click functionality provided by a graphical user interface and templates. The multi-ecosystem application platform as a service 102 also provides a framework for executing, managing and updating data-driven applications. The multi-ecosystem application platform as a service 102 may include data sources and also may be coupled to external data sources. The multi-ecosystem application platform as a service 102 provides a unified platform or environment for executing the data-driven applications, connecting to heterogeneous and disparate data sources, and interfacing with users via different platforms. One embodiment of the multi-ecosystem application platform as a service 102 will be described in more detail with reference to FIGS. 2-5.

The multi-ecosystem application platform as a service 102 is multidimensional in a number of respects. First, it allows multiple data sources to be connected or accessed via the cloud. These data sources can be on premise or off premise, or they can be a variety of different sources offered by different third parties. Second, it allows access and conductivity to multiple applications. These can be various Software as a Service applications (SaaS) offered via the web. The applications can also be custom business applications built for traditional RDBMS systems. Third, it can allow use of different development tools, for example, a model driven application development platform and a complete application development system Although only a single database system 104 is shown in FIG. 1, it should be understood that there may be one or more database systems 104 included in the system 100 in different embodiments. The database system 104 may be any one of a conventional type of database including a relational database management system (RDBMS). The database system 104 may include tools and other programs to create, update and administer a database. The database is preferably a relational database. As noted above, the database system 104 may be coupled by the network 108 for communication with the multi-ecosystem application platform as a service 102. The database system 104 may also be coupled for direct communication with the multi-ecosystem application platform as a service 102 as represented by signal line 116. In some embodiments the system 100 includes several different database systems 104. Although not shown, in such embodiments with many different database systems 104, some of the database systems 104 may be included within the multi-ecosystem application platform as a service 102 while others are external as represented by database system 104.

Although only a single software as a service server 106 is shown in FIG. 1, it should be understood that there may be one or more software as a service servers 106. The software as a service servers 106 provide access to software under a delivery model where the software and associated data are centrally hosted on the cloud. Access to the software and data can be done by the client 110 by the web browser 150. The multi-ecosystem application platform as a service 102 may access the data and software provided by the software as a service server 106 using an application interface (API) provided by the software as a service server 106 or similar mechanisms. The software as a service server 106 may provide software functionality including but not limited to office & messaging software, DBMS software, management software, CAD software, accounting, collaboration, customer relationship management (CRM), management information systems (MIS), enterprise resource planning (ERP), human resource management (HRM), content management (CM) and service desk management. The software as service server 106 is coupled to the network 108 for communication and cooperation with the multi-ecosystem application platform as a service 102.

The network 108 may be a conventional type, wired or wireless, and may have any number of configurations, for example, a star configuration, token ring configuration or other configurations. Furthermore, the network 108 may include a local area network (LAN), a wide area network (WAN) (e.g., the Internet), and/or any other interconnected data path across which multiple devices may communicate. In some implementations, the network 108 may be a peer-to-peer network. The network 108 may also be coupled to or include portions of a telecommunications network for sending data in a variety of different communication protocols. In some implementations, the network 108 includes Bluetooth communication networks or a cellular communications network for sending and receiving data, e.g., via short messaging service (SMS), multimedia messaging service (MMS), hypertext transfer protocol (HTTP), direct data connection, WAP, email, etc.

The client devices 110a-110n in FIG. 1 are used by way of example. While FIG. 1 illustrates two client devices 110a and 110n, the present disclosure applies to any system architecture having one or more client devices 110. The client devices 110 may include a web browser 150 for accessing and interacting with the multi-ecosystem application platform as a service 102, content provided by other servers or content accessible via the Internet. Furthermore, while only one network 108 is coupled to the client devices 110a-110n, multi-ecosystem application platform as a service 102, database systems 104 and the software as a service server 106 in practice one or more networks 108 can be connected to the entities.

Although not shown, in various other embodiments, the multi-ecosystem application platform as a service 102 may be coupled and cooperate with various other third-party servers. For example, in some implementations, a social network server may be included within the system 100. A social network server implements a social network where the users are connected by a common feature. The common feature includes relationships/connections, e.g., friendship, family, work, an interest, etc. Other third-party servers may provide access to big data, other social networks, relational databases, and other business operations.

In some implementations, the multi-ecosystem application platform as a service 102, the software as a service server 106 and the client device 110 hardware servers including a processor, a memory, and network communication capabilities. The client devices 110 can be portable computing devices. It should be understood that these systems 102, 106 and 110 could be any computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. As will be described below, it should be understood that the present technologies can operate on different models other than a client-server architecture. For example, the client devices 110 may include all or a portion of the multi-ecosystem application platform as a service 102

Figure 2:
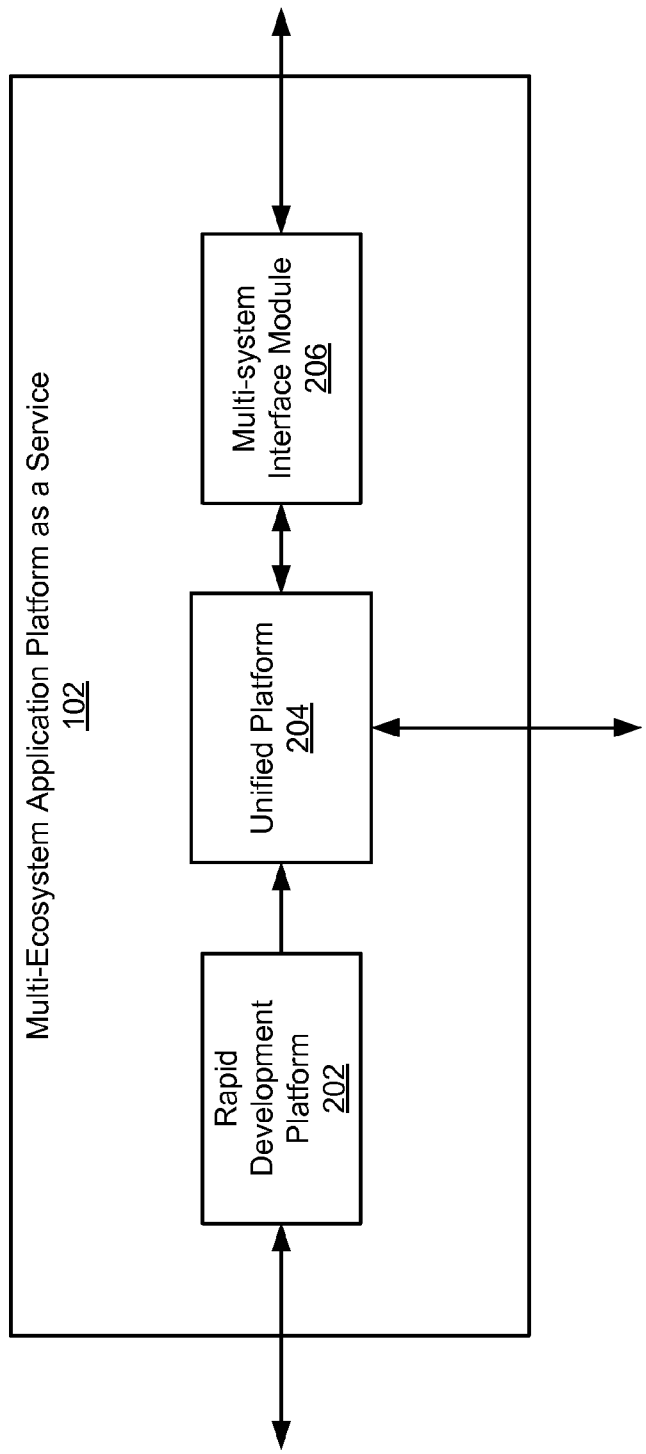
FIG. 2 is a high-level block diagram illustrating an example multi-ecosystem application Platform as a Service (aPaaS) according to one embodiment.

FIG. 2 is a high-level block diagram illustrating an example multi-ecosystem application Platform as a Service (aPaaS) 102 according to one embodiment. The multi-ecosystem application platform as a service 102 is a system for computing and comprises a rapid development platform 202, a unified platform 204, and a multisystem interface module 206. The multi-ecosystem application platform as a service 102 is particularly advantageous because it allows end-to-end model driven business applications to be developed. The multi-ecosystem application platform provides a seamless integrated suite of services. For example, it offers infrastructure as a service with the data-driven application development platform, data mart as a service, business as a service, mobility as a service, application platform as a service with a model driven application development platform, etc.

Another advantage is that multi-ecosystem application platform as a service 102 is capable of providing a flexible dynamic schema with a cloud database. More specifically, applications may be created on the multi-ecosystem application platform as a service 102 in the beginning using the model driven application development platform. While this model driven application development platform is easy and simple to use with its drag-and-drop functionality, some of the database operations are not performed in the most efficient manner. While performance is completely satisfactory when the size of the database is small and the business applications are not complex, as the database grows, there may be a need for a fixed schema that is capable of processing many more transactions much faster and that provides a high-level performance. The multi-ecosystem application platform as a service 102 allows implementation of a flexible dynamic schema because it allows the database to be easily migrated from an implementation primarily relying on the model driven application development platform to one where it utilizes a fixed schema including use of the complete application development system for the for implementing the functionality offered by the database. In some implementations, the multi-ecosystem application platform as a service 102 may use the schema provided by the model application development platform for a portion of the data while using a fixed schema for another portion of the data.

Another advantage is that the multi-ecosystem application platform is the Data-Driven Application Development Platform (See the data module below). The Data-Driven Application Development Platform allows business applications to be stored in and operating in the cloud. It also provides them with connectivity to access a variety of other data and services provided by other software as a service (SaaS) vendors. Once a mapping has been created between the Data-Driven Application Development Platform and a software as a service, that mapping can be used by the other components of the multi-ecosystem application platform to access data, access functionality, etc. In other words, the multi-ecosystem application platform is particularly advantageous because it offers in a single service: 1) flexible development schema; 2) an ability to have applications that access data organized by a combination of flexible and fixed schema; and 3) native multi-tenancy for storage of the data.

The rapid development platform 202 can be software or routines for creation, modification and management of a data-driven application. The rapid development platform 202 is coupled by the network to the client device 110 to receive input and commands from the user to create, modify and manage the data-driven application. In some embodiments, the rapid development platform 202 generates a graphical user interface that allows the user to create a data-driven application merely by inputting commands via point-and-click and drag-and-drop, and assembling modules or templates. The rapid development platform 202 is also coupled for communication and cooperation with the unifying platform 204 to provide a data-driven application. The rapid development platform 202 may publish the data-driven application to the unifying platform 204. This essentially initializes the data driven application for execution and operation on the unified platform 204. The rapid development platform 202 also receives input from the user 112 via the client device 110 to identify the data sources for the data-driven application. In cooperation with the unified platform 204 and the multisystem interface module 206, the user can use the rapid development platform 202 to specify data sources and connection types that will be used by the data-driven application. One embodiment for the rapid development platform 202 is shown in FIG. 3 and described in more detail below.

Figure 4A:
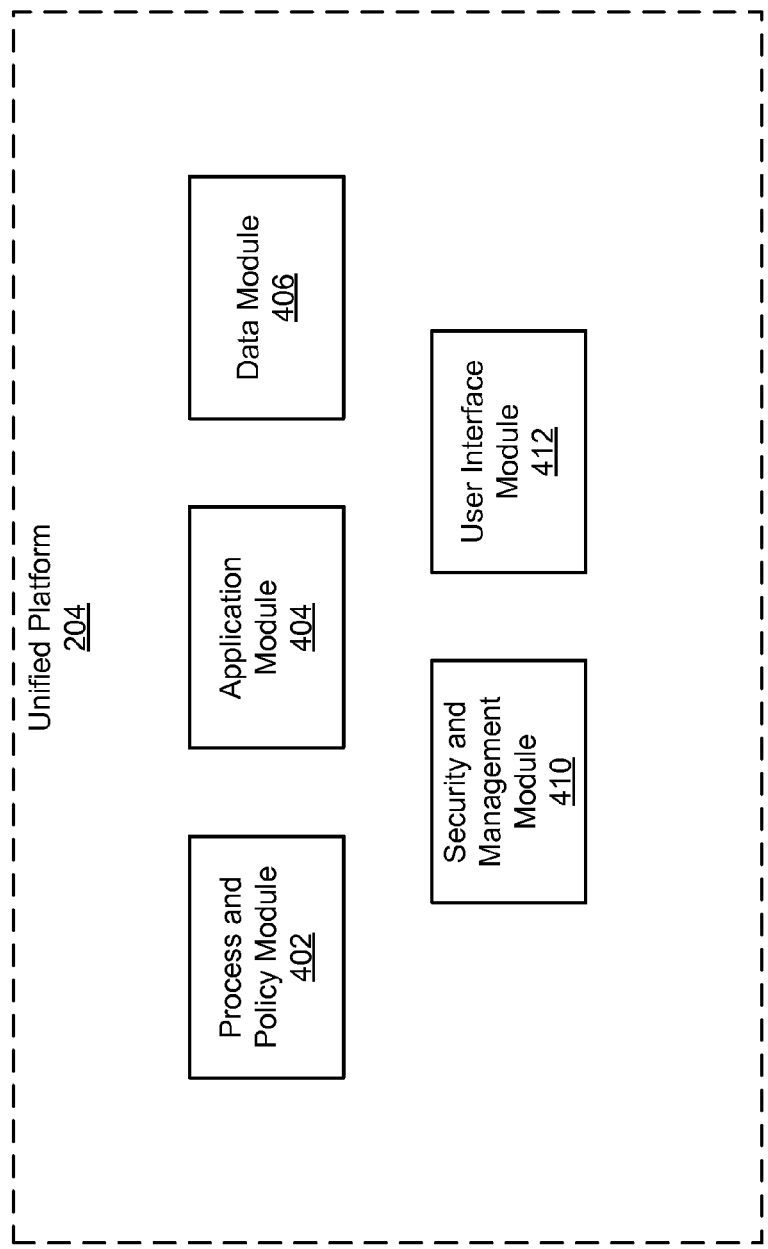
FIGS. 4A and 4B are high-level block diagrams illustrating example unified platforms according to some embodiments.
Figure 4B:
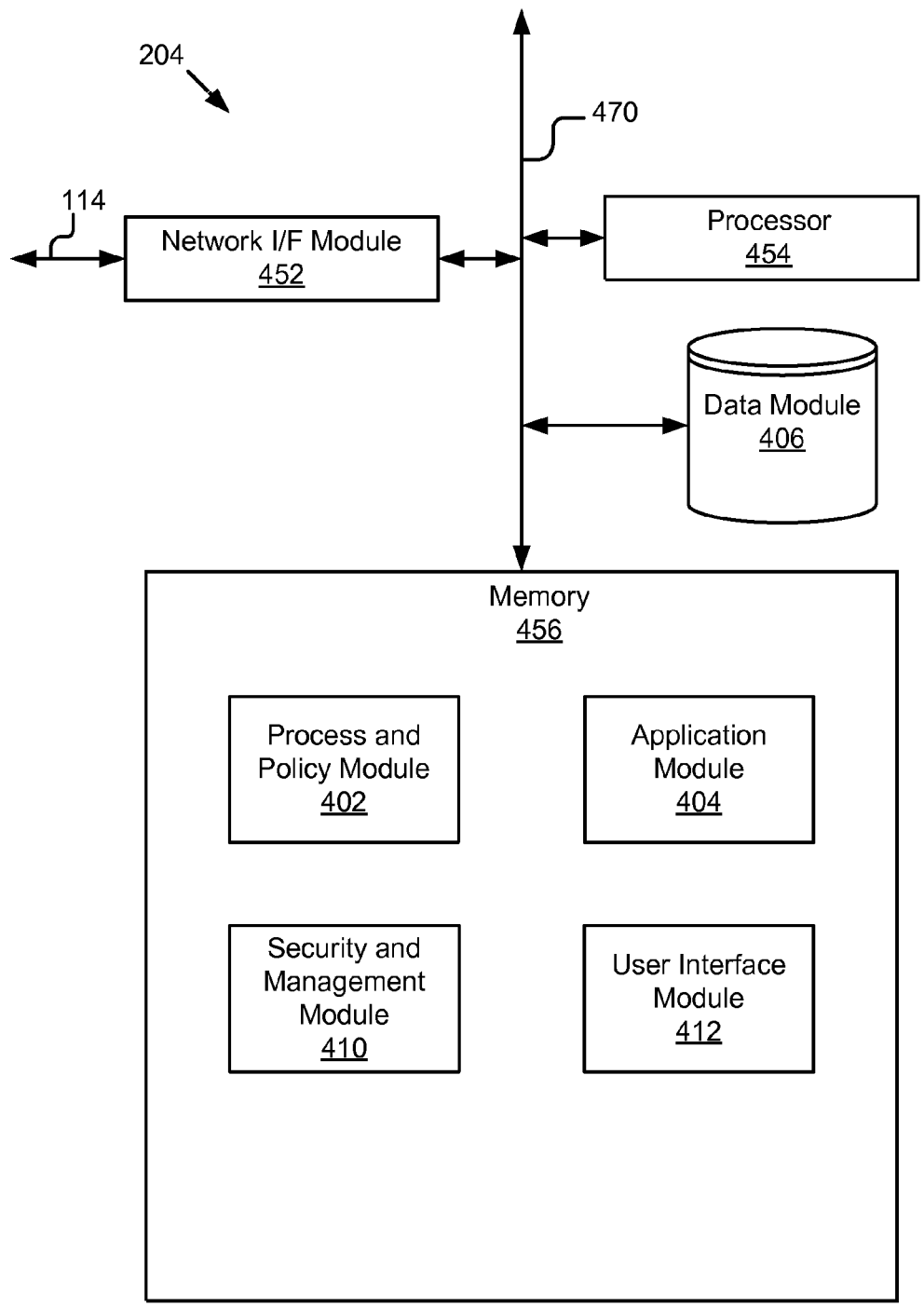

The unified platform 204 can be a system and software or routines for executing the data-driven application. The unified platform 204 is coupled to the rapid development platform 202 to receive and initialize the data driven application. The unified platform 204 capable of communicating with and modifying a plurality of data sources responsive to the data-driven application, and providing a unified environment for executing the data-driven application. More specifically, the unified platform 204 interfaces with different data sources including data sources that are part of the unified platform 204, data sources external to the unified platform 204, private data sources, public data sources, on premise data sources, off premise data sources, and third party data servers that act as data sources. In one specific example, part of the unified platform 204 is operable in the cloud so that he may be accessed directly by the cloud or through the unified platform 204. The unified platform 204 is also capable of executing the data-driven applications such that they may be accessed via a variety of different platforms are formats. For example, the unified platform and the data-driven application may be accessed via a mobile device, a desktop computer, the cloud, or social networks. The unified platform 204 may store information in a multi-tenancy the unified platform 204 may also include other tools for security, compliance, data management, security, business rules, business logic, etc. One embodiment for the unified platform 204 is shown in FIGS. 4A and 4B and described in more detail below.

Figure 5:
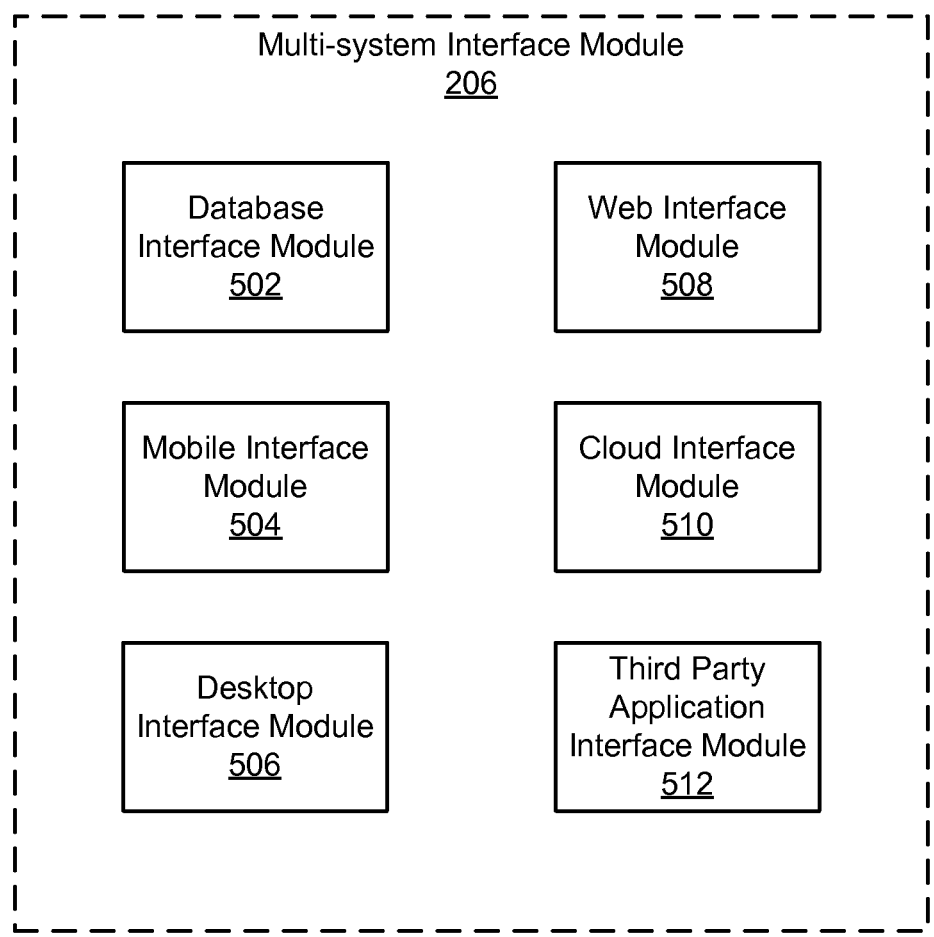
FIG. 5 is a high-level block diagram illustrating a multi-system interface module according to one embodiment.

The multisystem interface module 206 can be software or routines for accessing a plurality of data sources whether they be internal or external. The multisystem interface module 206 can also be software or routines for sending information to and receiving inputs from other platforms such as mobile, social, and cloud computing platforms. The multisystem interface module 206 performs data formatting and instruction conversion necessary to execute the business application across multiple different data sources. The multisystem interface module 206 also provides connectors or interfaces to allow the business application to interact and communicate with different platforms such as mobile, social, cloud and third party servers. One embodiment for the multisystem interface module 206 is shown in FIG. 5 and described below in more detail.

Figure 3:
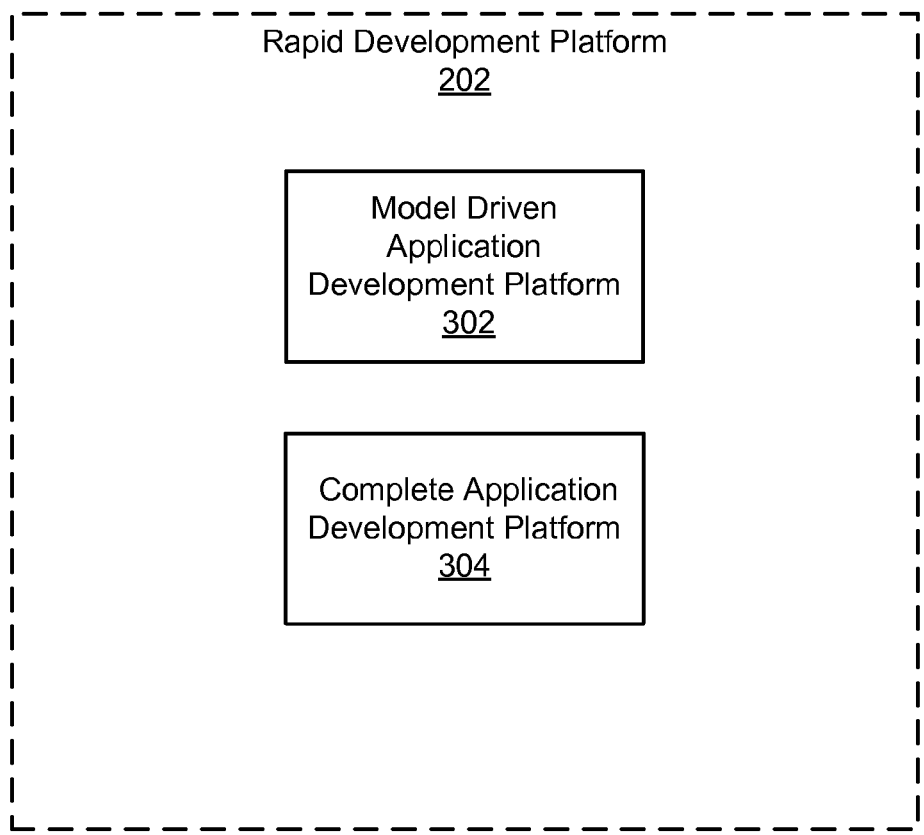
FIG. 3 is a high-level block diagram illustrating rapid development platform according to one embodiment.

Referring now to FIG. 3, a high-level block diagram illustrating rapid development platform 202 according to one embodiment will be described. The rapid development platform 202 comprises a model-driven application development platform or system 302 and a complete application development platform or system 304. Those skilled the art will recognize that other embodiments of the rapid development platform 202 may include additional platforms for creating data-driven business applications. The present invention is "multi-ecosystem" in that it is a combination of multiple different platforms and systems. In this example, the rapid development platform 202 includes two different ecosystems: the model-driven application development platform 302 and the complete application development platform 304.

The model-driven application development platform 302 is a model driven application development platform or system for generating SaaS business applications. In one embodiment, the model-driven application development platform 302 may be a cloud system hosted on an application server. The application server may be coupled to a database that includes templates (models) for use in building applications. The model driven application development platform 302 may allow a (non-technical) user to develop, test, deploy and publish a SaaS application via a web browser using point-and-click, drag-and-drop functionality to build the SaaS application with minimal coding. More technical users can use JavaScript, APIs and custom components in developing data-driven applications. In some embodiments, the model-driven application development platform 302 runs on the cloud, or on premise. The model-driven application development platform 302 may also integrate and work with third party libraries and produces. For example, in one embodiment, the model-driven application development platform or system is Rollbase manufactured and sold by Progress Software in Bedford, Mass. Other examples of model driven application development platforms are described in U.S. Application No. 61/887,021 entitled "External Objects For A Model-Driven Application Development System" filed Oct. 4, 2013; and U.S. Application No. 61/886,929 entitled "Granular or Partial Locking Within an Application" filed Oct. 4, 2013 the entirety of which are herein incorporated by reference.

The complete application development platform or system 304 is a development system for building dynamic process-enabled applications. In one embodiment, the complete application development platform 304 includes: an RDBMS, one or more data servers, and one or more applications servers. The complete application development platform 304 may also include Advanced Business Language (ABL) and JavaScript for managing the application servers, business processes and rules for applications, and user interfaces to provide mobile, desktop and web access. The complete application development platform 304 may also include application templates and jumpstarts. Some or all of these components may be part of the unified platform 204 and accessed by the complete application development platform 304. The complete application development platform 304 allows a user to build multi-tenancy SaaS applications (including mobile applications) using: Eclipse, mobile or browser based development. As mentioned above, in one embodiment, the complete application development platform 304 may include one or more of ABL, which is a comprehensive, easy to understand language with a rich feature set, Business Process Management (BPM), which a user uses to model a business process rather than coding the process, and Business Rule Management (BRM), which is decision logic decoupled from application code allowing rules to be changed as required by business without major modification to application and may beneficially result in a shorter development time. On example of such BPM and BRM are Corticon rules by Progress Software of Bedford, Mass.

FIG. 4A shows a high-level block diagram of the unified platform 204 according to some embodiments. As shown in FIG. 4A, the unified platform 204 includes a process and policy module 402, an application module 404, a data module 406, an analytics module 408, a security and management module 410, and a user interface module 412.

The process and policy module 402 can be software or routines for ensuring that the applications comply with business rules and business processes. In embodiments, the process and policy module 402 may be part of the complete application development platform 304 as has been described above with reference to FIG. 3. In other embodiments, the process and policy module 402 provides the Advanced Business Language (ABL), Business Process Management (BPM) and the Business Rule Management (BRM) for use in the unified platform 204 to modify existing applications. The process and policy module 402 is coupled for communication and cooperation with the other modules 404, 406, 410 and 412 of the unified platform 204.

The application module 404 can be software or routines for managing the operation of the data-driven applications. In some embodiments, the rapid development platform to those two generates and publishes a data-driven application. By publishing the data-driven application, the data-driven application is installed on the unified platform 204, in particular the application module 404. In some embodiments, the application module 404 includes one or more application servers for executing the data-driven applications. The application servers are coupled to access the data module 4042 access any number of various data sources. The application servers also communicate with the user interface module 412 to communicate with external data sources as well as various platforms for delivering content, receiving content and receiving commands. In one embodiment, the application server is coupled to a database (e.g., the data module 406). In one embodiment, the database supports multi-tenancy at the database level. In one embodiment, the database may use the advanced business language. For example, in one embodiment, the application module 404 is part of OpenEdge by Progress Software in Bedford, Mass. and includes the features described above. The application module 404 is coupled for communication and cooperation with the other modules 402, 406, 410 and 412 of the unified platform 204.

The data module 406 can be software or routines for providing access to a variety of data resources whether they be external to the unified platform 204 or part of the input unified platform 204. In some embodiments, the data module 406 may include a relational database management system, replication software and one or more data servers. In some embodiments, the data module 406 includes a multitenant database. In one embodiment, the data module 406 includes a Data-Driven Application Development Platform that offers one or more of 1) access to any data source (on premises or in the "cloud"); 2) access to any applications (including SaaS applications, big data, social networks, relational, and business operation applications); 3) access to other platforms; 4) a Cloud solution in which data stored in the cloud, applications are usable via the web and access to data can be shared with third parties. In one embodiment, the Data-Driven Application Development Platform includes a Connectivity Service that manages and updates APIs so an application developer does not have to. In one embodiment, the Connectivity Service is a cloud based connectivity service. For example, in one embodiment, the data module 406 may be the Data-Driven Application Development Platform including a Connectivity Service offered as DataDirect Cloud by Progress Software in Bedford, Mass. Other examples of Data-Driven Application Development Platform are described in U.S. Application No. 61/825,744 entitled "DataDirect Cloud" filed May 21, 2013; and U.S. application Ser. No. 14/173,727 entitled "Connectivity as a Service" filed Feb. 5, 2014, the entirety of which are herein incorporated by reference. The data module 406 is coupled for communication and cooperation with the other modules 402, 404, 410 and 412 of the unified platform 204.

The security and management module 410 can be software or routines for controlling access to the data provided by the unified platform 204. Since the unified platform 204 is a multi-tenancy data platform is critical that only the authorized users access their own data and applications provided by the unified platform 204. The security and management module 410 includes software and routines for ensuring that the data and applications are accessed only by those who are authorized to access the data. The security and management module 410 manages user access, data and network encryption, etc. The security and management module 410 also manages the application module 404 and the data module 406 to ensure highly reliable scalable performance. For example, the security and management module 410 manages replication, backup, failover cluster support and audit functions. The security and management module 410 is coupled for communication and cooperation with the other modules 402, 404, 406 and 412 of the unified platform 204.

The user interface module 412 can be software or routines for presenting the business application to the user via various different platforms. The user interface module 412 is coupled to and communicates with the various modules 502-514 of the multisystem interface module 206. In some implementations, the user interface module 412 sends the content items and commands to the various modules 502-514 of the multisystem interface module 206. More specifically, the user interface module 412 is responsible for presenting the information generated by the business application, and receives and processes commands, instructions and input received from the various modules 502-514 of the multisystem interface module 206. The user interface module for 12 is coupled for communication and cooperation with the other modules 402, 404, 406 and 410 of the unified platform 204.

Referring now to FIG. 4B, another embodiment of the unified platform 204 is described. In this embodiment, the unified platform 204 includes the network interface (I/F) module 452, a processor 454, a data module 406 and a memory 456. These components of the unified platform 204 are communicatively coupled to a bus or software communication mechanism 470 for communication with each other.

The network interface module 452 is coupled to the network 108 by signal line 114. The network interface module 452 is also coupled to the bus 470. The network interface module 452 includes ports for wired connectivity including but not limited to USB, SD, or CAT-5, etc. The network interface module 452 links the processor 454 to the network 108 that may in turn be coupled to other processing systems. The network interface module 452 provides other conventional connections to the network 108 using standard network protocols, e.g., TCP/IP, HTTP, HTTPS and SMTP. In some implementations, the network interface module 452 includes a transceiver for sending and receiving signals using WiFi, Bluetooth® or cellular communications for wireless communication.

The processor 454 may include an arithmetic logic unit, a microprocessor, a general purpose controller or some other processor array to perform computations and provide electronic display signals to a display device. The processor 454 is coupled to the bus 470 for communication with the other components. Processor 454 processes data signals and may include various computing architectures including a complex instruction set computer (CISC) architecture, a reduced instruction set computer (RISC) architecture, or an architecture implementing a combination of instruction sets. Although only a single processor is shown in FIG. 4B, multiple processors may be included. It should be understood that other processors, operating systems, sensors, displays and physical configurations are possible.

The memory 456 stores instructions and/or data that may be executed by the processor 454. In the illustrated implementation, the memory 456 stores the process and policy module 402, the application module 404, the analytics module 408, the security and management module 410 and the user interface module 412. Those modules 402, 404, 408, 410 and 412 have the same or similar functionality as described above with reference to FIG. 4A so that description will not be repeated here. The modules 402, 404, 408, 410 and 412 may be software including routines for generating and providing the unified platform. In some implementations, the modules 402, 404, 408, 410 and 412 may be a set of instructions executable by the processor 454 to provide the functionality described in this application for providing the unified platform. In some implementations, the modules 402, 404, 408, 410 and 412 may be adapted for cooperation and communication with the processor 454 and other components of the unified platform 204 via bus 470. The instructions and/or data may include code for performing any and/or all of the techniques described herein. The memory 206 may be a dynamic random access memory (DRAM) device, a static random access memory (SRAM) device, flash memory or some other memory devices.

The data module 406 may be a data store or a non-transitory memory that stores data. For example, the data module 406 may be a dynamic random access memory (DRAM) device, a static random access memory (SRAM) device, flash memory or some other memory device. In some implementations, the storage 208 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

Software communication mechanism 470 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 470 can be implemented on any underlying hardware, for example, a network, the Internet, a bus, a combination thereof, etc.

Referring now to FIG. 5, a high-level block diagram illustrating a multi-system interface module 206 according to one embodiment is described. The multi-system interface module 206 comprises a database interface module 502, a mobile interface module 504, a desktop interface module 506, a web interface module 508, a cloud interface module 510 and a third party application interface module 512. In one embodiment, the multi-system interface module 206 may be Easyl by Progress Software in Bedford, Mass. Other examples of the multi-system interface module 206 are described in U.S. Application No. 61/791,621 entitled "Data Management System" filed Mar. 15, 2013; and U.S. application Ser. No. 14/095,658 entitled "Data Management System" filed Dec. 3, 2013 the entirety of which are herein incorporated by reference.

The database interface module 502 can be software or routines for connecting and interfacing with a database. In some embodiments, the database may be on premise or may be part of the unified platform 204. In other embodiments, the database may be off premises or available via private network and accessible via a direct connection, an Internet connection or an application interface. In either case, the database interface module 502 provides a connection between the database and the unified platform 204, in particular the data-driven business application. More specifically, the database interface module 502 provides developer interface support, security, conversion and mapping support and database and network communication. For example, the developer interface support may include: codeless configuration, emulation for missing database functionality, SQL upleveling, connection management, threat protection and statement pooling. Conversion and mapping support may include: error handling, consistent metadata support, international codepage support, data conversion support, and encryption and decryption. Finally, database and network communication support may include: socket management, network wire management, bulk, batch and throughput optimization, failover support, load balancing, and distributed transaction support. The database interface module 502 may be used to connect the unified platform 204 with conventional relational databases. The database interface module 502 is coupled to the unified platform 204 and the database systems 104.

The mobile interface module 504 can be software or routines for connecting and interfacing with mobile devices operate on various mobile platforms. The mobile devices are accessible to the multi-ecosystem application platform as a service 102 via the network 108 (refer back to FIG. 1). More specifically, the mobile interface module 504 provides a connection between an application operable on the unified platform 204 and various mobile devices. Like the database interface module 502, the mobile interface module 504 provides developer interface support, security, conversion and mapping support and database and network communication. The mobile interface module 504 provides functionality similar to that described above with reference to the database interface module 502, but for mobile devices. The mobile interface module 504 is coupled to the unified platform 204 and the client devices 110.

The desktop interface module 506 can be software or routines for connecting and interfacing with proprietary applications available via desktop interfaces. The proprietary third-party systems are accessible to the multi-ecosystem application platform as a service 102 via the network 108 or via direct connection. More specifically, the desktop interface module 506 provides a connection between proprietary systems offering desktop applications and the unified platform 204. Like the database interface module 502, the desktop interface module 506 provides developer interface support, security, conversion and mapping support and database and network communication. The desktop interface module 506 provides functionality similar to that described above with reference to the database interface module 502, but for desktop applications. The desktop interface module 506 may be used to connect the unified platform 204 with business operations systems available via desktop interfaces. The desktop interface module 506 is coupled to the unified platform 204 and the desktop application (not shown).

The web interface module 508 can be software or routines for connecting and interfacing with any system accessible via the World Wide Web. The web accessible systems are capable of being connected to and communicating with the multi-ecosystem application platform as a service 102 via the network 108. More specifically, the web interface module 508 provides a connection between web accessible systems and the unified platform 204. Like the database interface module 502, the web interface module 508 provides developer interface support, security, conversion and mapping support and database and network communication. The web interface module 508 provides functionality similar to that described above with reference to the database interface module 502, but for web accessible systems. The web interface module 508 is coupled to the unified platform 204 and the network 108 for connection to the web accessible systems.

The cloud interface module 510 can be software or routines for connecting and interfacing with systems accessible via the cloud. Systems accessible via the cloud are capable of being connected to and communicating with the multi-ecosystem application platform as a service 102 via the network 108. More specifically, the cloud interface module 510 provides a connection between cloud systems and the unified platform 204. Like the database interface module 502, the cloud interface module 510 provides developer interface support, security, conversion and mapping support and database and network communication. The cloud interface module 510 provides functionality similar to that described above with reference to the database interface module 502, but for cloud systems. For example, the cloud interface module 510 may be used to connect the unified platform 204 with existing software as a service platforms that are accessible via the cloud including systems customer relationship management (CRM), management information systems (MIS), enterprise resource planning (ERP), human resource management (HRM), content management (CM), etc. The cloud interface module 510 may also be used to connect to social networks like Facebook, LinkedIn, Twitter, and G+. The cloud interface module 510 is coupled to the unified platform 204 and the network 108 for connection to the cloud systems.

The third party application interface module 512 can be software or routines for connecting and interfacing with any other third party application. Such third party applications are capable of being connected to and communicating with the multi-ecosystem application platform as a service 102 via the network 108. The third party application interface module 512 provides a connection between any third party system and the unified platform 204. Like the database interface module 502, the third party application interface module 512 provides developer interface support, security, conversion and mapping support and database and network communication. The third party application interface module 512 provides functionality similar to that described above with reference to the database interface module 502, but for the specific third party system. For example, the third party application interface module 512 may be used to connect the unified platform 204 with systems that offer access to big data, no SQL access to data, etc. The third party application interface module 512 is coupled to the unified platform 204 and the network 108 for connection to the cloud systems.

Figure 6:
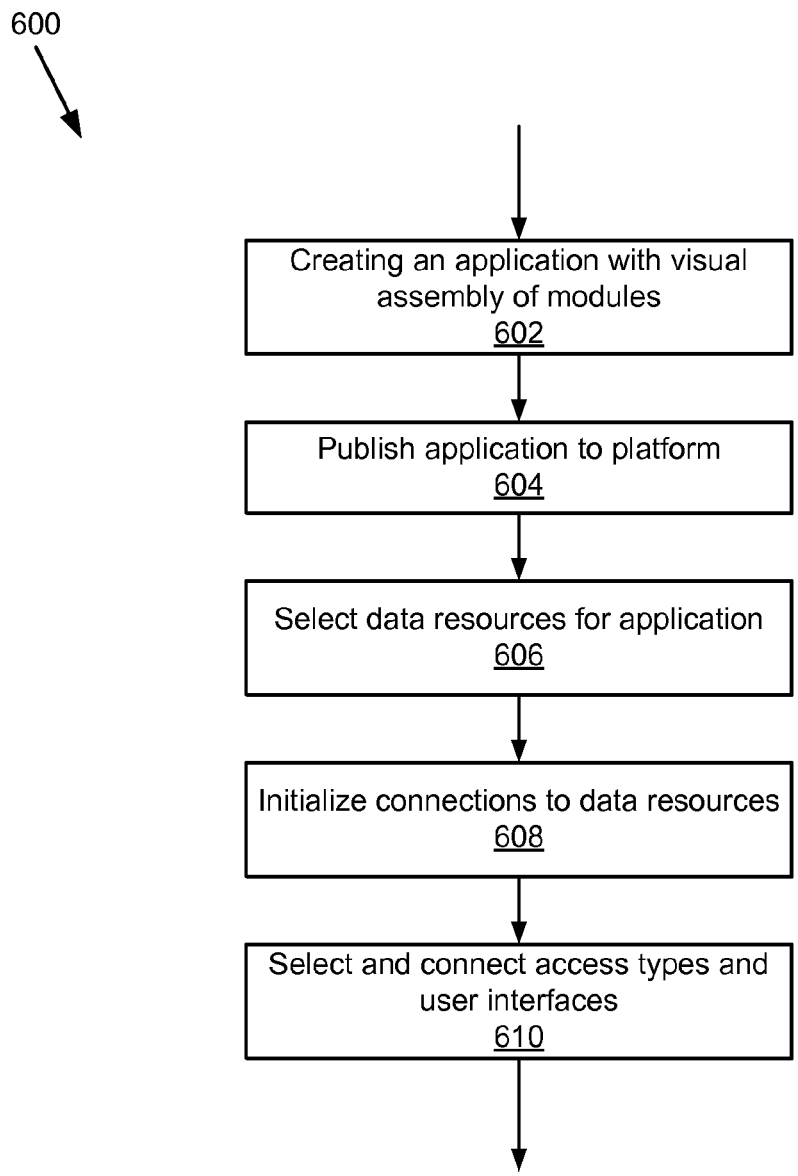
FIG. 6 is a flow chart illustrating an example method for creating an application using the multi-ecosystem application Platform as a Service (aPaaS).

Referring now to FIG. 6, an example method 600 for creating an application using the multi-ecosystem application Platform as a Service (aPaaS) is described. The method 600 begins by creating 602 an application by visually assembling modules. In particular, a user 112 interacts with via the client device 110 with the model driven application development platform 302 of the rapid development platform 202 to create a data-driven application. As has been noted above, the user can use the point-and-click and drag-and-drop functionality as well as templates provided by the model driven application development platform 302 to create an application. Once the application has been created, the user interacts with the model driven application development platform 302 to publish 604 the application to the unified platform 204. For example, the rapid development platform 202 may send the data-driven application to be installed on the application module 404 of the unified platform 204. Next, resources are selected 606 for the data-driven application. In one embodiment, the rapid development platform 202 is used to specify the data sources for the data-driven application. In another embodiment, the tools provided by the unified platform 204 can be used to specify the data sources for the application. Next, the unified platform 204 initializes 608 connections with the data resources specified in block 606. Finally, the method completes with the selection and connection to access types and user interfaces. More specifically, the unified platform 204 identifies the access types and user interfaces needed to connect with the platforms specified by the business application. The unified platform 204 interacts with the multisystem interface module 206 to establish connections and communications with the platforms specified by the business application. Once the connections have been established, the application is operational and running.

Systems and methods for a multi-ecosystem application Platform as a Service (aPaaS) have been described. It should be understood that the terms "products" and "services" are used interchangeably throughout this specification and are used herein to encompass their plain and ordinary meaning including, but not limited to any online service, online product, online software that provides online endorsement services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
   one or more processors;
   a rapid development platform adapted to receive input and allow a user to create a data-driven application by inputting a command and visually assembling one or more modules, the rapid development platform receiving input from the user to identify a data source for the data-driven application, and
   providing a graphical user interface and a template for use in creating the data driven application;
   a unified platform for executing the data-driven application, the unified platform coupled to the rapid development platform to receive and initialize the data-driven application, the unified platform capable of communicating with and modifying a plurality of data sources responsive to the data-driven application, and
   providing a unified environment for executing the data-driven application, the unified platform including an analytics module for monitoring operation and performance of the data-driven application; and
   a multi-system interface module having inputs and outputs for coupling the unified platform to the plurality of data sources.

2. The system of claim 1 wherein the rapid development platform includes a model driven application development platform for generating software as a service (SaaS) business applications.

3. The system of claim 1 wherein the rapid development platform includes a complete application development platform for building dynamic business process-enabled applications.

4. The system of claim 1 wherein a portion of the unified platform application is operable in the cloud.

5. The system of claim 1 wherein the unified platform includes an on premise relational database management system.

6. The system of claim 1 wherein the unified platform also provides a unified environment for managing and maintaining data-driven application.

7. The system of claim 1 wherein the unified platform includes a process and policy module for enforcing business processes and business rules upon execution of the data-driven application.

8. The system of claim 1 wherein the unified platform includes a security and management module for controlling security of access to the data, data management, and integration of business logic.

9. The system of claim 1 wherein the unified platform includes one or more data servers and a replication module.

10. The system of claim 1 wherein the multi-system interface module includes a database interface module for enabling communication between a database and the unified platform, wherein the database interface module is coupled to the unified platform and the database.

11. The system of claim 1 wherein the multi-system interface module includes a mobile interface module for enabling communication between a mobile device and the unified platform, the mobile interface module coupled to the unified platform and the mobile device.

12. The system of claim 1 wherein the multi-system interface module includes a web interface module for enabling communication between a web tools and the unified platform, the web interface module coupled to the unified platform and the web tools.

13. The system of claim 1 wherein the multi-system interface module includes a third party interface module for enabling communication between a third party application and the unified platform, the third party interface module coupled to the unified platform and the third party application.

14. The system of claim 13 wherein the third party application is one from the group of a social network application, a software as a service application, a customer relationship management application, and human resources application, and an enterprise resource planning application.

15. A method comprising:
building, using one or more computing devices, a data-driven application;
publishing, using the one or more computing devices, the data-driven application to a platform by installing the data-driven application on the platform;
selecting, using the one or more computing devices, a data resource for the data-driven application from a plurality of data resources;
initializing, using the one or more computing devices, a connection between the selected data resource and the data-driven application;
selecting, using the one or more computing devices, an access type and a user interface for accessing the application; and
monitoring, using the one or more computing devices, operation and performance of the data-driven application.

16. The method of claim 15 wherein building the data-driven application includes selecting parameters and visual assembly modules.

17. The method of claim 15 wherein the data resources includes one or more from the group of an on premise database, an off premise database, a software as a service application, a data set, a public data source, and a private data source.

18. The method of claim 15 wherein the access types and user interfaces include mobile, desktop and web.

19. A computer program product comprising a computer usable medium including a computer readable program, wherein the computer readable program when executed on a computer causes the computer to perform:
building a data-driven application;
publishing the data-driven application to a platform by installing the data-driven application on the platform;
selecting a data resource for the application from a plurality of data resources;
initializing a connection between the selected data resource and the application;
selecting an access type and a user interface for accessing the application; and
monitoring operation and performance of the data-driven application.

\* \* \* \* \*